(12) United States Patent
Kuravangi-Thammaiah et al.

(10) Patent No.: US 12,519,790 B2
(45) Date of Patent: Jan. 6, 2026

(54) COMPUTERIZED SYSTEM AND METHOD FOR ENHANCED AUTHORIZATION OF NETWORK DATA

(71) Applicant: VERIZON PATENT AND LICENSING INC., Basking Ridge, NJ (US)

(72) Inventors: Shanthala Kuravangi-Thammaiah, Keller, TX (US); Violeta Cakulev, Millburn, NJ (US); Ye Huang, San Ramon, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 295 days.

(21) Appl. No.: 17/537,105

(22) Filed: Nov. 29, 2021

(65) Prior Publication Data
US 2023/0171255 A1    Jun. 1, 2023

(51) Int. Cl.
*H04L 9/40* (2022.01)
*H04L 9/32* (2006.01)
*H04W 12/084* (2021.01)

(52) U.S. Cl.
CPC .......... *H04L 63/10* (2013.01); *H04W 12/084* (2021.01)

(58) Field of Classification Search
CPC ... H04W 12/084; H04W 12/00; H04W 12/08; H04W 12/06; H04L 63/10
USPC .......................................................... 726/7
See application file for complete search history.

(56) References Cited

U.S. PATENT DOCUMENTS

| | | | | |
|---|---|---|---|---|
| 2019/0251241 | A1* | 8/2019 | Bykampadi | H04W 12/009 |
| 2020/0119909 | A1* | 4/2020 | Zhang | H04L 63/0435 |
| 2021/0112404 | A1* | 4/2021 | Xin | H04L 63/102 |
| 2021/0288802 | A1* | 9/2021 | Muhanna et al. | H04W 12/084 |
| 2022/0182835 | A1* | 6/2022 | Rajput | H04L 9/0891 |
| 2022/0248225 | A1* | 8/2022 | Bykampadi et al. | H04W 12/08 |
| 2022/0287089 | A1* | 9/2022 | Singh | H04W 72/51 |
| 2022/0360989 | A1* | 11/2022 | Rajput | H04W 12/06 |
| 2023/0283470 | A1* | 9/2023 | Rodrigo | H04W 12/08 713/172 |

FOREIGN PATENT DOCUMENTS

| | | | | |
|---|---|---|---|---|
| EP | 3962136 | A1 * | 3/2022 | ......... H04L 63/0807 |
| EP | 4092982 | A1 * | 11/2022 | ......... H04L 63/0807 |
| KR | 20220144739 | A * | 10/2022 | ........... H04L 63/083 |
| WO | WO-2021018460 | A1 * | 2/2021 | ......... H04L 65/1073 |
| WO | WO-2021140272 | A1 * | 7/2021 | |
| WO | WO-2021160386 | A1 * | 8/2021 | |
| WO | WO-2021176131 | A1 * | 9/2021 | |
| WO | WO-2022018580 | A1 * | 1/2022 | |

* cited by examiner

Primary Examiner — Haresh N Patel

(57) ABSTRACT

Systems and methods for an advanced authorization framework that provides advanced network security and control of network hosted data. The framework provides computerized mechanisms that dictate a control of which data is accessible by particular network components, and which operations the privileged components are enabled to be performed. The framework can allow Network Function (NF) service consumers to discover and request network data that is specific to the operational status (e.g., PCF can request policy data). The framework provides an access scope of the NF service consumer that manages which hosted data is accessible, and to what degree it can be manipulated, if at all.

20 Claims, 6 Drawing Sheets

COMPUTERIZED SYSTEM AND METHOD FOR ENHANCED AUTHORIZATION OF NETWORK DATA

BACKGROUND

Communications providers and communications standards often use an authorization framework that allows Network Function (NF) service producers to authorize requests from NF service consumers (also referred to as service requestors or functions, interchangeably). An authorization framework can use an Open Framework (e.g., OAuth 2.0 framework) to grant a third-party web site or application access to a user's resources.

DETAILED DESCRIPTION OF EXAMPLE EMBODIMENTS

Figure 1:
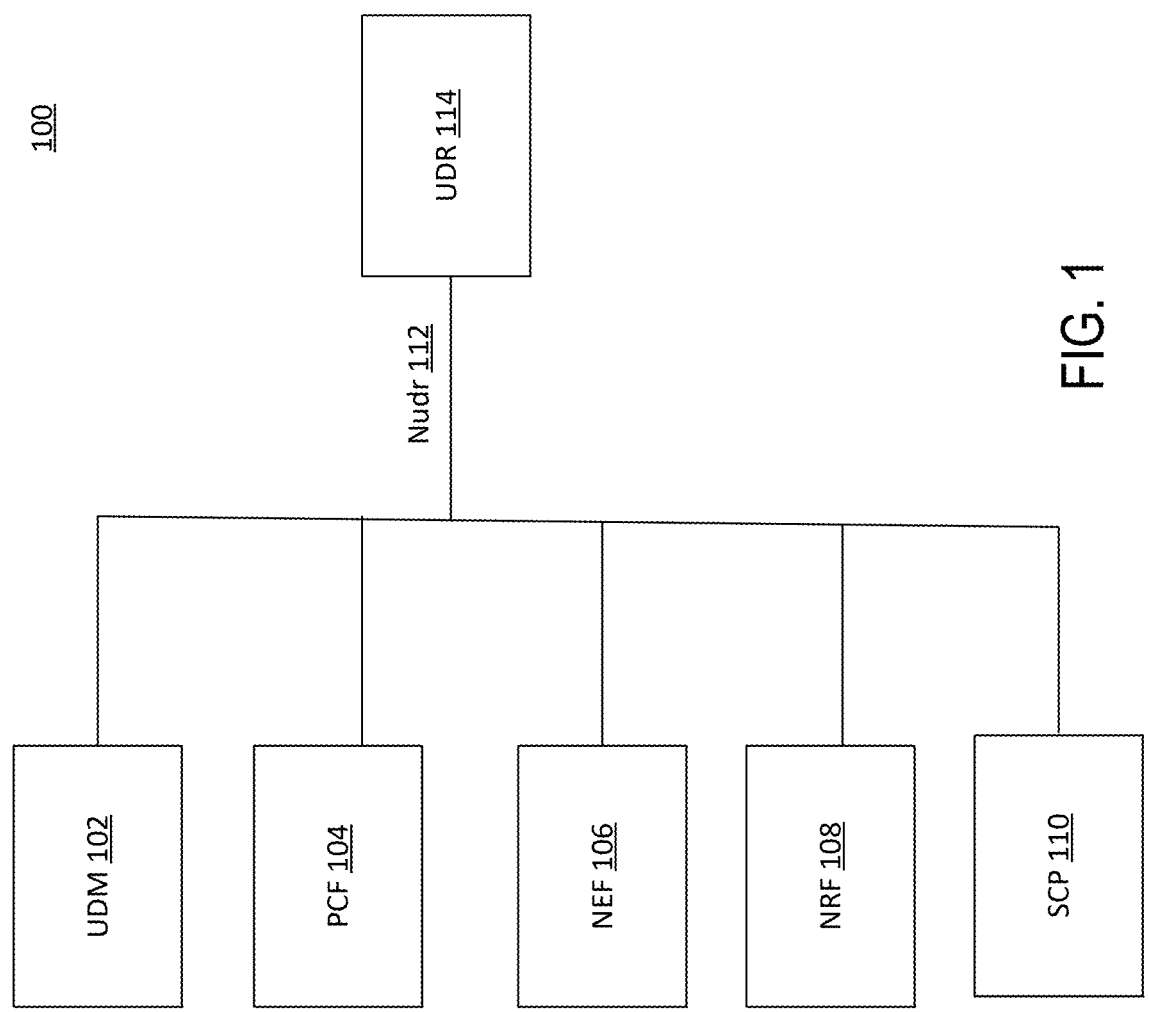
FIG. 1 is a block diagram illustrating an exemplary network configuration of data storage and access system according to some embodiments of the present disclosure.

Authorization frameworks are configured to provide access control to network entity data stored in a Unified Data Repository (UDR). In some embodiments, a UDR can be the network component or entity in a fifth-generation (5G) Core network that supports and manages storage of network entity data.

According to some embodiments, network entity data can include, but is not limited to, subscription data, policy data, structured data for exposure, application data, group identifier (ID) mapping data, and the like. As discussed in more detail below, the UDR can host these forms of data, whereby through a Nudr interface (e.g., a HTTP2 based RESTful interface for NFs and provisioning clients), NF service consumers can request and/or access specific forms of data.

As discussed below, NF service consumers can include, but are not limited to, UDM (unified data management component), PCF (policy control function), NEF (network exposure function), NRF (network function repository function), SCP (service communication proxy), and the like.

Under current network protocols, NF service consumers, such as NEF and PCF, can be authorized via the NRF to access the data the UDR manages. However, current authorization protocols do not provide controls and/or capabilities for the UDR to control which forms of data NF service consumers are accessing, while also controlling which types of actions (e.g., operations) they are taking on such data.

The disclosed systems and methods, therefore, provide an advanced authorization framework that provides advanced security and control to a UDR. As discussed in more detail below, the disclosed framework provides enhanced authorization mechanisms that enable the UDR to distinguish an access scope of its housed data that includes information that is specific to the requesting NF service consumer and the NF service consumer's intent.

By way of a non-limiting example, when a PCF on a network requests policy data access in order to write to the stored policy data in the UDR, under the disclosed systems and methods, the UDR can discern whether the PCF is requesting accessible forms of data, and whether the PCF is permitted to actually perform the specified write request (e.g., the specifically identified/requested action on the data).

As discussed in more detail below, the information that enables the UDR to perform this determination can be in the form of a specifically granted (e.g., identified, determined or generated/created) access token that the NRF provides the requesting NF service consumer (here, the PCF, for example). In some embodiments, as discussed below, the NRF can be configured to couple with the UDR to securely expose services and features of the network (e.g., services and features of the 5G core, for example).

According to some embodiments, as discussed below, an access token can be configured as a token based on, but not limited to, a type of opaque string, extensible authentication protocol (EAP), JavaScript Object Notation (JSON) web token, JSON Web Token (JWT), and/or any other type of secure and/or encrypted digital object that presents a securely held digital signature and/or authentication message.

Thus, the disclosed systems and methods provide an extensive authorization framework that manages data via advanced security measures that are based on the scope of the requests for the data—specifically, what data is being requested, and what form of action is being requested on such data.

With regard to FIG. 1, an example network configuration 100 of an example 5G Core network is disclosed. While the discussion herein will focus on 5G network components, it should not be construed as limiting, as other network configurations, such as, for example fourth-generation (4G) Cores and its components can be utilized without departing from the scope of the instant application.

In some embodiments, network configuration 100 can include, but is not limited to, NF nodes of UDM 102, PCF 104, NEF 106, NRF 108, SCP 110 and UDR 114, and Nudr interface 112, as illustrated in FIG. 1.

According to some embodiments, UDM 102 operates to manage network user data as a centralized element. UDM 102 is a 5G element that may be equivalent to the home subscriber service (HSS) within 4G networks.

According to some embodiments, PCF 104 is a control plane NF of a 5G core. PCF 104 may support quality of service (QoS) for policy and charging control functions and related signaling interfaces.

According to some embodiments, NEF 106 may facilitate secure access to exposed network services and capabilities. In some embodiments, for example, NEF 106 may enable on-demand services to be provided to developers and enterprises.

According to some embodiments, NRF 108 may be a service-based architectural element of a network (e.g., the 5G Core), and it may provide a record of the NF operations and services available within a network(s). In some embodiments, the network can be a 5G network, wireless network, cellular network, or a combination of those represented via a public land mobile network (PLMN).

According to some embodiments, NRF 108 can provide a NF profile that can include both general instance attributes and the corresponding attribute values of a NF's operations, as well as instance specific service attributes and attribute values of the services on the network. For example, PCF 104 can have a registered profile that includes information corresponding to the attribute "allowedOperationsPerNf Instance" to indicate one or more operations it is allowed to perform on the policy data hosted by UDR 114. Further details of NF profiles, and their usage in providing access scopes for specific operations on specifically hosted forms of data are discussed in more detail below in relation to at least FIG. 3.

According to some embodiments, SCP 110 operates to efficiently and securely manage routing operations within a network. In some embodiments, SCP 110 can operate to route messages within and between multiple intra-data centers via information provided by NRF 108.

According to some embodiments, as discussed below in more detail, SCP 110 can enable communication between various NF nodes, such as, for example UDM 102, PCF 104, NEF 106 and UDR 114. In the illustrated example of FIG. 1, the NF nodes UDM 102, PCF 104 and NEF 106 can operate as NF service consumers, and UDR 114 can operate as a NF service producer. Thus, for example, SCP 110 can enable communication of the NF nodes with the UDR 114 (via the Nudr interface 112, as discussed below).

According to some embodiments, UDR 114 can be viewed as a converged repository of network entity data, which as discussed above, can include, but is not limited to, subscription data, policy data, structured data for exposure, application data, group identifier (ID) mapping data, and the like. In some embodiments, UDR 114 can host these forms of data for access by components 102-110 (among other forms of NFs and requestors) via interface Nudr 112. Nudr 112 can operate as a radio interface for cellular networks that enables physical connections with the UDR 114 by requesting network components.

Figure 2A:
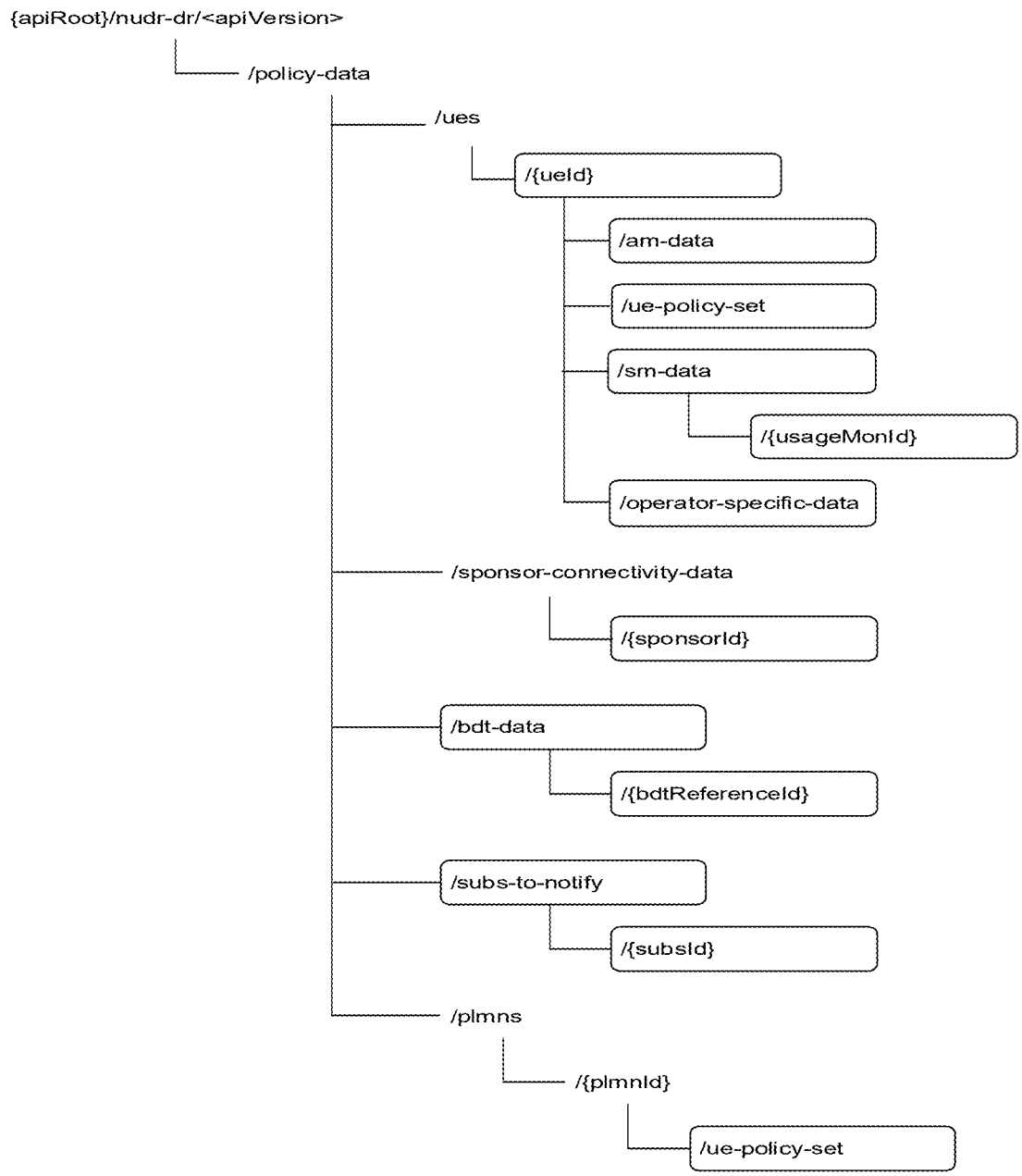
FIGS. 2A-2B illustrate non-limiting examples of resource data structures according to some embodiments of the present disclosure.
Figure 2B:
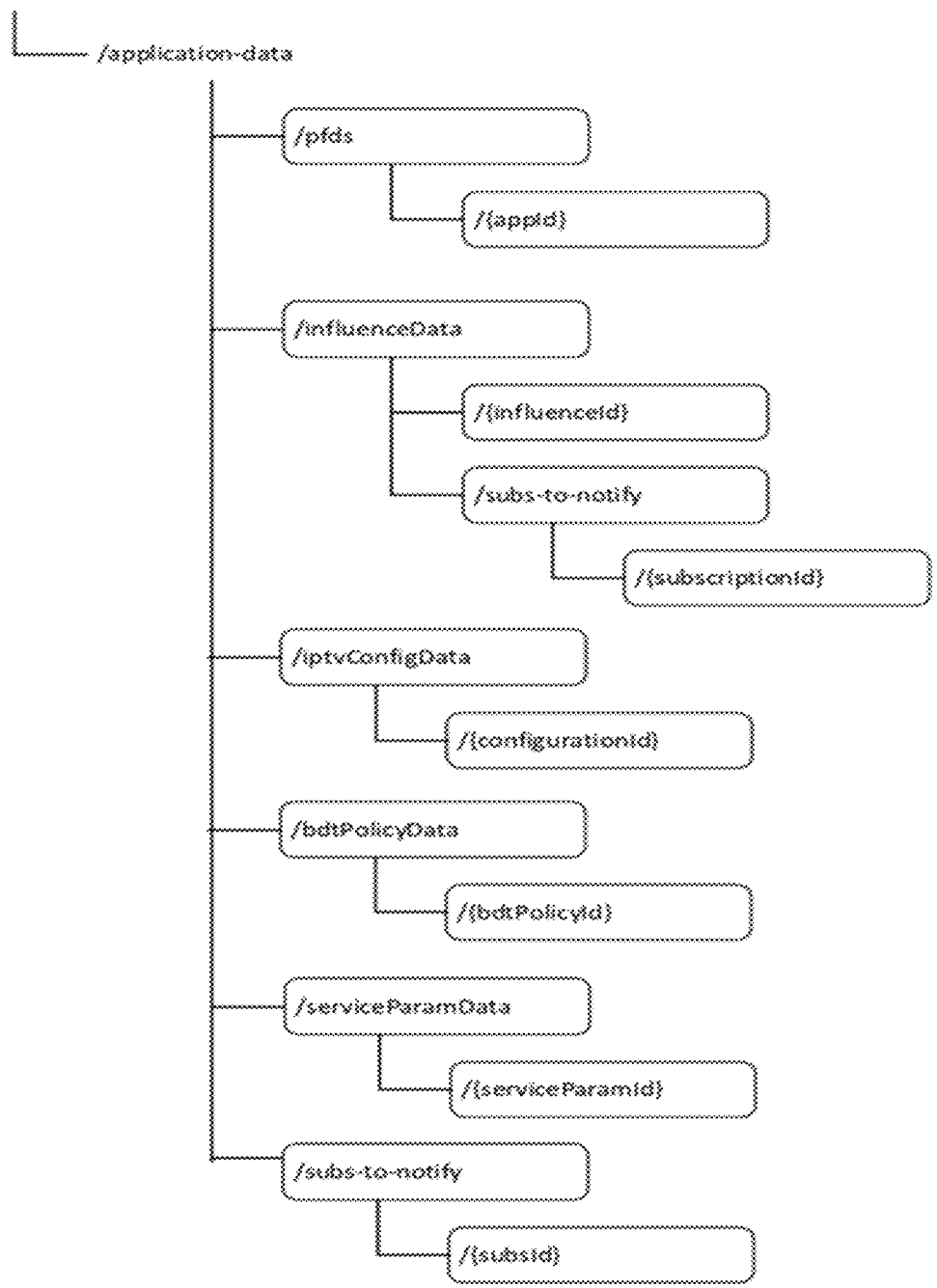

According to some embodiments, the resources hosted at UDR 114 may be stored in resource data structures, as illustrated in FIGS. 2A-2B, and discussed below. In some embodiments, data structures for specific forms of data (e.g., policy data and application data, as illustrated in FIGS. 2A and 2B, respectively) can comprise resource definitions. In some embodiments, such resource definitions may specify a resource name, resource Uniform Resource Identifier (URI), an applicable Hypertext Transfer Protocol (HTTP) method, and the like. In some embodiments, such definitions may be organized into directories or sub-definitions that can further refine a resource it is dependent upon, as illustrated in FIGS. 2A-2B.

In some embodiments, data and/or their data structures can be accessed via URI calls included in API calls fed through the Nudr interface 112 (e.g., calls via a Nudr-dr API, for example). For example, PCF 104 may request policy data within UDR 114 via interface Nudr 112 via a request: {apiRoot}/{nudri-dr/apiVersion}/subscription-data. In some embodiments, other forms of commands can also be used, such as, for example, HTTP GET commands which can specify top level data within a resource data structure, and can further identify sub-level resources via included query parameters in the command(s).

According to some embodiments, Nudr 112 may support service operations associated with the data hosted at UDR 114 to include one or more types of operations of, but not limited to: Query, Create, Delete, Update, Subscribe, Unsubscribe, and Notify. Using these operations, NF service consumers may retrieve, create, modify, delete, and update data of interest in URD 114. Similarly, with the operations Subscribe and Unsubscribe, NF service consumers may subscribe and unsubscribe to forms of data and/or services. In some embodiments, Nudr 112 may implement a set of Nudr-DataRepository APIs to provide the above-described resource access services.

In some embodiments, NF service authorization can be required before a NF service consumer can access the NF services provided by UDR 114. According to some embodiments, NF service authorization, may be performed by NRF 108 using various policies pre-provisioned in network configuration 100, such as, for example, OAuth 2.0. For purposes of this disclosure such authorization will be understood as established for purposes of detailing the novel mechanisms for providing specifically designated access to specific forms of data, as discussed herein.

FIGS. 2A and 2B each provide non-limiting example embodiments of resource data structures of data that can be hosted by UDR 114.

FIG. 2A illustrates an exemplary resource data structure 200 for policy data stored at UDR 114. As shown in this illustrative embodiment, the policy data can be structured to include a multitude of data fields that may recursively include one or more data fields. In the example illustrated in FIG. 2A, at the highest level, the policy data is organized into the set of sub-resource data represented in the data fields of: /ues, /sponsor-connectivity-data, /bdt-data, /subs-to-notify, and /plmns, respectively. Each sub-resource data can be further organized into one or more levels of sub-levels. As such, each of the above-described data fields can be refined to include one or more levels of recursive sub-level data fields.

For example, as illustrated in FIG. 2A, the /bdt-data field can include a sub-level data field of /bdtReferenceID. Accordingly, via a Nudr_DataRepository Service API, the sub-resource bdt data of the policy data may be accessed at a URI of: {apiRoot}/{nudri-dr/apiVersion}/policy-data/bdt-data; and the sub-resource bdtReferenceID data of the bdt data may be accessed at a URI of: {apiRoot}/{nudri-dr/apiVersion}/policy-data/bdt-data/bdtReferenceID.

FIG. 2B illustrates an exemplary resource data structure 250 for application data stored at UDR 114. As shown in this illustrative embodiment, the application data can similarly be structured to include a multitude of data fields that may recursively include one or more data fields. In the example illustrated in FIG. 2B, at the highest level, the application data is organized into the set of sub-resource data represented in the data fields of: /pfds, /influenceData, /iptvConfigData, /bdtPolicyData, /servcieParmaDaa, and /subs-to-notify, respectively. Each of the sub-resource data can be further organized into one or more levels of sub-levels. As such, each of the above-described data fields can be refined to include one or more levels of recursive sub-level data fields.

For example, as illustrated in FIGS. 2B, the /pfds field can include a sub-level data field of /ueid, the /influenceData field can include sub-level data fields of /influenceId, and /subs-to-notify, which can further include another sub-level data field of /subscriptionid, and the /bdtPolicyData field can include a sub-level data field of /bdtPolicyId.

Accordingly, to illustrate a few examples, via the Nudr_DataRepository Service API, the sub-resource pfds data of the application data may be accessed at a URI of: {apiRoot}/{nudri-dr/apiVersion}/application-data/pfds; the sub-resource influence data of the application data may be accessed at a URI of: {apiRoot}/{nudri-dr/apiVersion}/application-data/influenceData; while the sub-resource bdt policy data of the application data may be accessed at a URI of: {apiRoot}/{nudri-dr/apiVersion}/application-data/bdtPolicyData.

As to the sub-resources, the data of the pfds data may be accessed at a URI of: {apiRoot}/{nudri-dr/apiVersion}/policy-data/pfds/appid, the influenceId data of the influence data may be accessed at a URI of: {apiRoot}/{nudri-dr/apiVersion}/policy-data/influenceData/influenceId, the subs-to-notify data of the influence data may be accessed at a URI of: {apiRoot}/{nudri-dr/apiVersion}/policy-data/influenceData/subs-to-notify, the subscriptionId data of the subs-to-notify data may be accessed at a URI of: {apiRoot}/{nudri-dr/apiVersion}/policy-data/influenceData/subs-to-notify/subscriptionId, and the bdtPolicyID data of the bdtPolicy data may be accessed at a URI of: {apiRoot}/{nudri-dr/apiVersion}/policy-data/influenceData/bdtPolicyData/bdtPolicyId.

According to some embodiments, UDR 114 may further define a set of operations permitted for one or more of these resource URIs and sub-resource URIs when accessed during a requested data service from a NF service consumer (e.g., PCF 104, and NEF 106). In some embodiments, the set of operations can include, but are not limited to, read, modify and write. According to some implementations, a modify operation may include one or both of a delete operation and an update operation.

By way of a non-limiting example, application data can be augmented in its definition with information indicating a type of access (and/or operational) scope, as follows:
nudr-dr:application-data:read
nudr-dr:application-data:modify
nudr-dr:application-data:write In another non-limiting example, according to some embodiments, policy data can be augmented in its definition with information indicating a type of access (and/or operational) scope, as follows:
nudr-dr:policy-data:read
nudr-dr:policy-data:modify
nudr-dr:policy-data:write According to some embodiments, sub-resources of the data structures can correspond to, but are not limited to, packet data flows (PFDs), influence data (influenceData) and background data flows (bdt), and the like. Therefore, in some embodiments, such sub-resources of stored application data and policy can be augmented as follows:
nudr-dr:application-data:pfds:read
nudr-dr:application-data:pfds:modify
nudr-dr:application-data:pfds:write
nudr-dr:application-data:influenceData:read
nudr-dr:application-data:influenceData:modify
nudr-dr:application-data:influenceData:write
nudr-dr:application-data:bdtPolicyData:read
nudr-dr:application-data: bdtPolicyData:modify
nudr-dr:application-data: bdtPolicyData:write
nudr-dr:policy-data:bdt-data:read
nudr-dr:policy-data:bdt-data:modify
nudr-dr:policy-data:bdt-data:write
nudr-dr:application-data:influenceData:modify
nudr-dr:application-data:influenceData:write In some embodiments, UDR 114 may specify the above-described exemplary resource structure augmented with the access control mechanisms in its NF profile registered with NRF 108, along with other attribute information. For example, UDR 114 may specify the augmented resource structures in association with NF specific service authorization information attributes. In another example, UDR 114 may specify the augmented resource structures in association with the identification of stored data/information attributes.

Therefore, using the above-illustrated exemplary operation levels defined for one or more resource URIs, one or more sub-resource URIs, or some combination thereof, UDR 114 can provide scoped access control to its hosted resources/data. As mentioned above and discussed in more detail below, scoped access control corresponds to granted specific NFs access to specific data (e.g., policy data for PCF), whereby such access is granted under the condition of being able to perform particular action on such data (e.g., read, write, modify). Detail with regard to how such exemplary access control mechanisms are utilized to authorize a NF service consumer for scoped access to the requested resources at UDR 114 is described with reference to FIG. 3 below.

Figure 3:
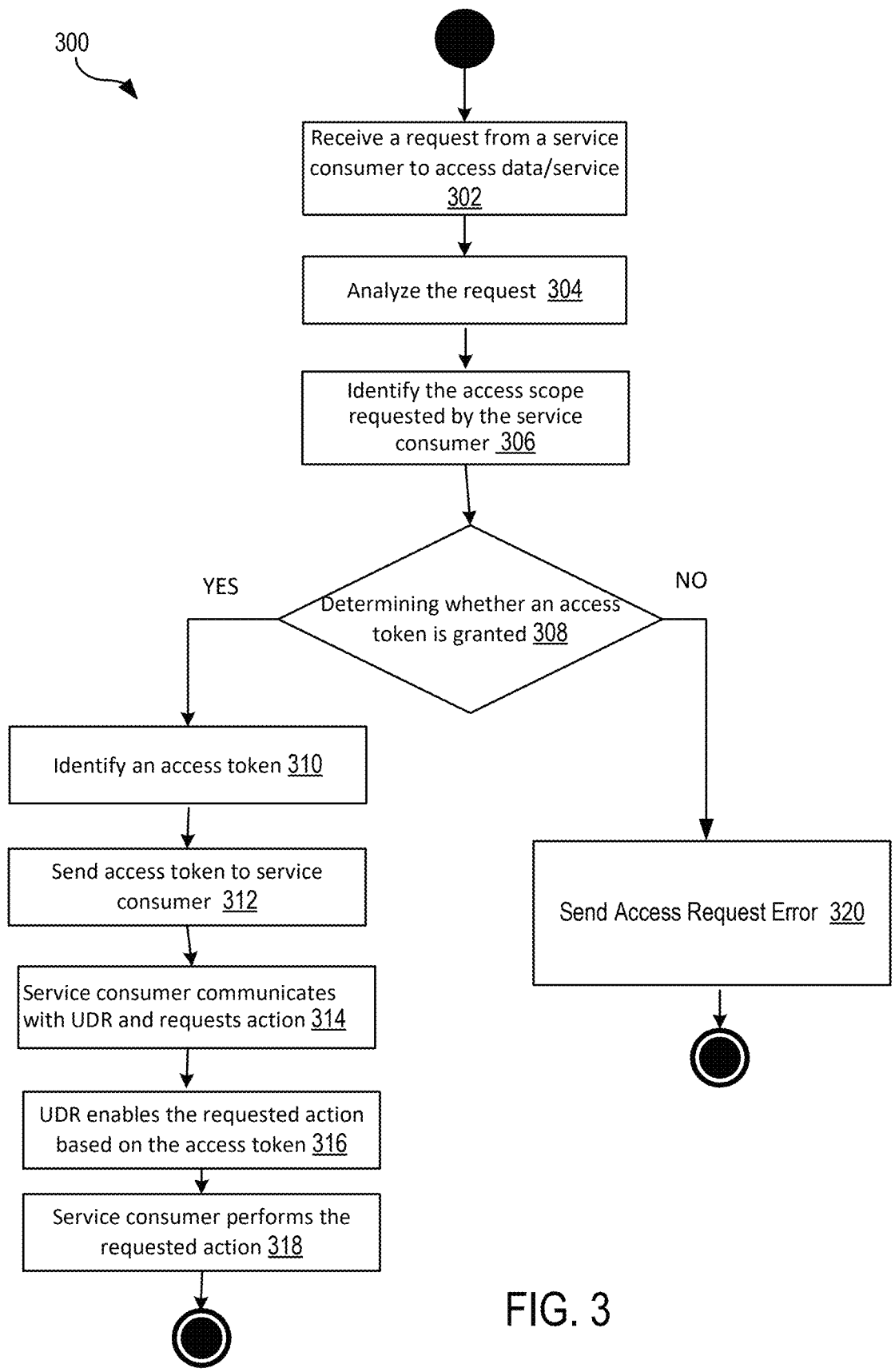
FIG. 3 is a flow diagram illustrating an exemplary process for resource authorization according to some embodiments of the present disclosure.

FIG. 3 illustrates a flow diagram of an exemplary Process 300 for authorization based resource access according to some embodiments of the present disclosure. The components of FIG. 1 will be used to discuss the operations of the steps of Process 300.

Process 300 begins with Step 302 where NRF 108 may receive a request from a service consumer to access a service (e.g., access data to perform an operation, as discussed above). According to some embodiments, the request can include information related to, but not limited to, the requesting NF (e.g., PCF 104 or NEF 106, for example), the data being requested, which action is being requested, and the like, or some combination thereof. In some embodiments, the request may further include an authorization indication (e.g., client ID, auth_code, or EAP) provides a verified identify of the requestor.

By way of a non-limiting example, the request received in Step 302 can be from PCF 104 (from FIG. 1), and it can include information related to PCF 104's request to modify existing policy data hosted by UDR 114. Therefore, the request can include, for example, the following information, as discussed above: nudr-dr:policy-data:modify.

According to some embodiments, the request in Step 302 can be configured as a generated discovery request to NRF 108. In some embodiments, such a discovery request may include, but is not limited to, the requested NF service name, the NF type of the requested NF service (e.g., UDR 114), NF type of the requesting NF service consumer (e.g., PCF, NEF), and the like.

In Step 304, the request from Step 302 is analyzed by the NRF 108. In some embodiments, the NRF 108 can parse the request and identify the information included and/or referenced therein. For example, Step 304 can involve the NRF 108 analyzing the request, and identifying the requested NF service name, the NF type of the requested NF service (e.g., UDR 114), NF type of the requesting NF service consumer (e.g., PCF, NEF), and the like, as discussed above.

Using the above PCF example discussed in relation to Step 302, Step 304 can then involve the NRF 108 determining that the PCF 104 desires to modify the policy data for a specific type of network policy it manages. For example, the NRF 108 can identify the specific type of PDFs and/or influence data the PCF 104 is requesting modify/write access to.

In Step 306, NRF 108 may identify the access scope being requested in Step 302's request. As discussed above, the access scope corresponds to which data is being solicited (or requested access to), and which actions are then going to be performed once access is granted. Thus, for example, the access scope for the PCF 104 in the above example can include information or indicate i) policy data related to a specific type of policy, and ii) an action to be performed on that policy data (e.g., modify). In some embodiments, for example, this can be provided and/or indicated via an access scope string: nudr-dr:policy-data:bdt-data:modify.

In Step 308, NRF 108 may determine whether an access token can be granted. In other words, Step 308 involves the determination of whether the requesting service consumer is i) permitted to access the data being requested, and ii) whether it is capable of performing the requested action on such data should access be granted.

For example, PCF 104 typically handles policy requests and policy management. Therefore, read, write and modify access to policy data can be typically granted as per the definitions set in the UDR 114 and the NF profile of the PCF 104, as discussed above. However, should the request be for data that is not enabled or permitted for the PCF 104 (e.g., application data, group ID mapping data, for example), then the request may be denied.

In embodiments, where the request is denied, which can be based on whether the data being requested is restricted from the requesting service consumer, or whether the requested action is denied from being performed, Process 300 can proceed from Step 308 to Step 320.

In Step 320, the NRF 108 compiles an access error message, and communicates it back to the requesting service consumer (from Step 302). In some embodiments, for example, NRF 108 may return an HTTP POST response indicating a "400 Bad Request" status code. In some embodiments, the payload of the response may include a JSON object providing details with regard to the specific error incurred.

In some embodiments, however, when NRF 108 determines that the access token is to be granted, Process 300 proceeds from Step 308 to Step 310. Here, the determination has indicated that the access scope is authorized (e.g., that the data is permitted to be accessed, and the action being requested is also permitted to be performed by the requesting service consumer).

In Step 310, NRF 108 can identify the access token for the requesting service consumer. In some embodiments, the identification of the access token can involve retrieving an access token (e.g., from the UDR 114, or another network location), modifying an existing token for the service consumer, and/or generating a newly created token.

In some embodiments, the access token can be valid for a predetermined period of time. In some embodiments, such time period can correspond to a time from which the request from Step 302 is received. In some embodiments, the time period can correspond to a number of actions or iterations the requesting service consumer can perform before the token expires. For example, in some embodiments, the access token may be for a one-time use, and should the service consumer desire to perform the same or similar type of action on the same or similar type of data at a later time, then it must have another request reprocessed according to the steps of Process 300 discussed herein.

According to some embodiments, the access token can include information related to, but not limited to, identification information of the service consumer, requested data/service identifier and/or type, action type (e.g., read, write, modify) lifetime (e.g., time period and/or number of uses), as mentioned above, and the like.

In some embodiments, NRF 108 may digitally sign the access token with, for example, a private key for authorization by the Nudr 112 and/or UDR 114, which can be performed upon the requested data being made available to the requesting service consumer, as discussed below.

In Step 312, the access token determined in Step 310 may be sent to the requesting service consumer from Step 302 by NRF 108. In some embodiments, the access token may be embedded in a payload of an HTTP POST response indicating a "200 OK" status code.

In Step 314, upon receiving the access token, the service consumer communicates with UDR 114 and may request performance of the request from Step 302. In some embodiments, the request/communication can include, the access token and/or additional information that was included in Step 302's request, or some combination thereof.

In some embodiments, the service consumer may communicate with UDR 114, which, for example, can perform an authentication procedure with the UDR 114 (e.g., mutual Transport Layer Security (mTLS) handshake), as a Bearer credential and transmitted in an HTTP Authorization header to the API of UDR 114 via the Nudr 112, and/or any other type of secure authorization procedure for securely requesting data over a network.

In Step 316, upon receiving the access token from the service consumer, UDR 114 can determine its integrity and/or what data is being requested, and enable the requested action based on the access token. According to some embodiments, UDR 114 can validate the access token to determine whether to enable the requested action, namely, whether the authenticated service consumer has been authorized for performing the action.

By way of non-limiting examples, UDR 114 can validate one or more of aspects of the access token including: an NRF signature, the expiration date, scope, service type, the identification information of the service consumer, and the like. For example, in addition to validating other aspects of the access token, UDR 114 may ensure that the action requested matches the action included in the access token request in Step 302 (as recorded by NRF 108).

In Step 318, having been validated/approved by the UDR 114, the service consumer is granted access to the data and can perform the requested action. For example, PCF 104 can access the specific policy data, and modify it as indicated in the request from Step 302.

Figure 4:
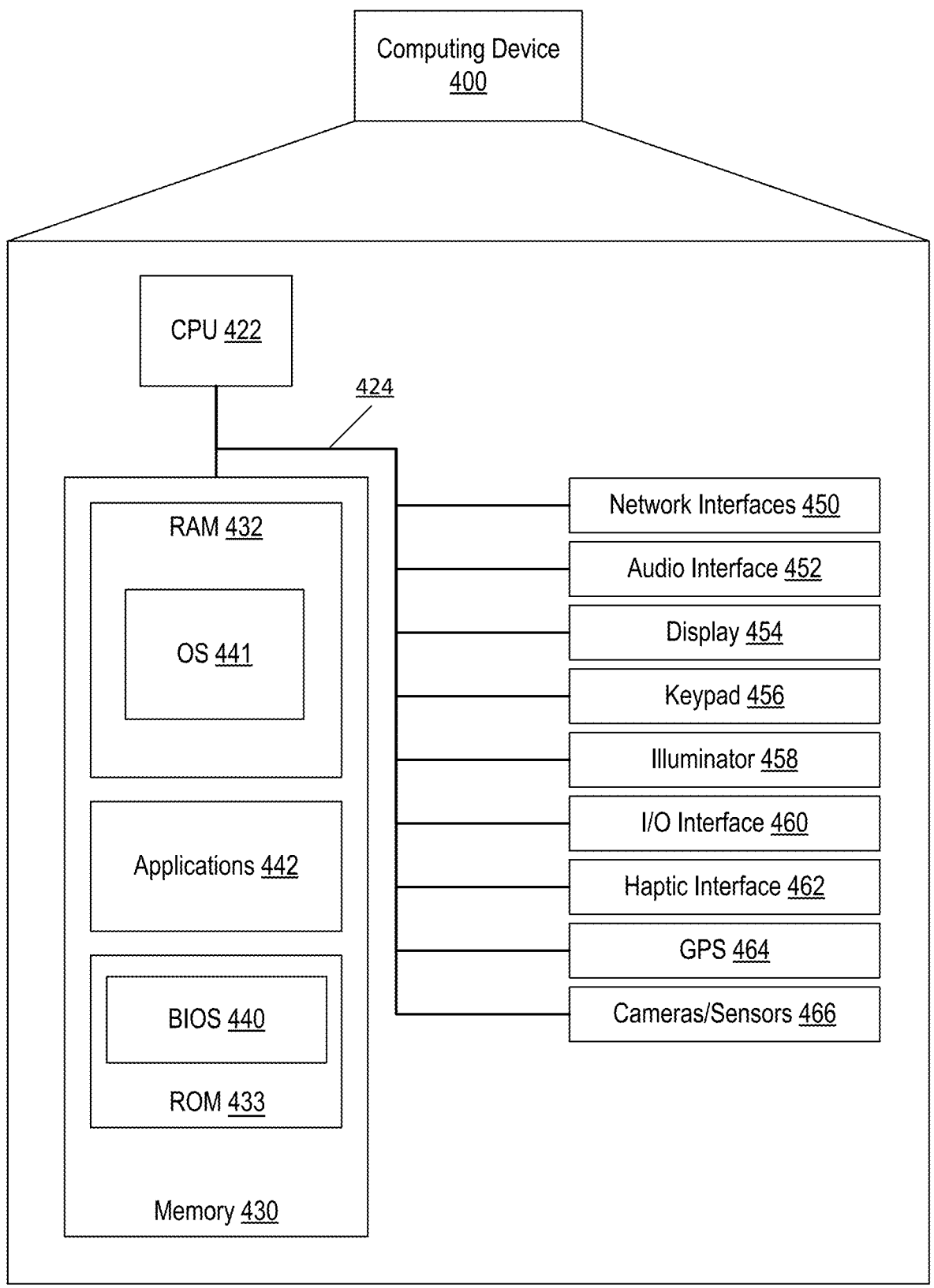
FIG. 4 is a block diagram illustrating a computing device used in the various embodiments of the present disclosure.

FIG. 4 is a block diagram illustrating a computing device showing an example of service consumer device or an authorization server device used in the various embodiments of the disclosure.

The computing device 400 may include more or fewer components than those shown in FIG. 4, depending on the deployment or usage of the device 400. For example, a server computing device, such as a rack-mounted server, may not include audio interfaces 452, displays 454, keypads 456, illuminators 458, haptic interfaces 462, GPS receivers 464, or cameras/sensors 466. Some devices may include additional components not shown, such as graphics processing unit (GPU) devices, cryptographic co-processors, artificial intelligence (AI) accelerators, or other peripheral devices.

As shown in FIG. 4, the device 400 includes a central processing unit (CPU) 422 in communication with a mass memory 430 via a bus 424. The computing device 400 also includes one or more network interfaces 450, an audio interface 452, a display 454, a keypad 456, an illuminator 458, an input/output interface 460, a haptic interface 462, an optional global positioning systems (GPS) receiver 464 and a camera(s) or other optical, thermal, or electromagnetic sensors 466. Device 400 can include one camera/sensor 466 or a plurality of cameras/sensors 466. The positioning of the camera(s)/sensor(s) 466 on the device 400 can change per device 400 model, per device 400 capabilities, and the like, or some combination thereof.

In some embodiments, the CPU 422 may comprise a general-purpose CPU. The CPU 422 may comprise a single-core or multiple-core CPU. The CPU 422 may comprise a system-on-a-chip (SoC) or a similar embedded system. In some embodiments, a GPU may be used in place of, or in combination with, a CPU 422. Mass memory 430 may comprise a dynamic random-access memory (DRAM) device, a static random-access memory device (SRAM), or a Flash (e.g., NAND Flash) memory device. In some embodiments, mass memory 430 may comprise a combination of such memory types. In one embodiment, the bus 424 may comprise a Peripheral Component Interconnect Express (PCIe) bus. In some embodiments, the bus 424 may comprise multiple busses instead of a single bus.

Mass memory 430 illustrates another example of computer storage media for the storage of information such as computer-readable instructions, data structures, program modules, or other data. Mass memory 430 stores a basic input/output system ("BIOS") 440 for controlling the low-level operation of the computing device 400. The mass memory also stores an operating system 441 for controlling the operation of the computing device 400.

Applications 442 may include computer-executable instructions which, when executed by the computing device 400, perform any of the methods (or portions of the methods) described previously in the description of the preceding Figures. In some embodiments, the software or programs implementing the method embodiments can be read from a hard disk drive (not illustrated) and temporarily stored in RAM 432 by CPU 422. CPU 422 may then read the software or data from RAM 432, process them, and store them to ROM 433.

The computing device 400 may optionally communicate with a base station (not shown) or directly with another computing device. Network interface 450 is sometimes known as a transceiver, transceiving device, or network interface card (NIC).

The audio interface 452 produces and receives audio signals such as the sound of a human voice. For example, the audio interface 452 may be coupled to a speaker and microphone (not shown) to enable telecommunication with others or generate an audio acknowledgment for some action. Display 454 may be a liquid crystal display (LCD), gas plasma, light-emitting diode (LED), or any other type of display used with a computing device. Display 454 may also include a touch-sensitive screen arranged to receive input from an object such as a stylus or a digit from a human hand.

Keypad 456 may comprise any input device arranged to receive input from a user. Illuminator 458 may provide a status indication or provide light.

The computing device 400 also comprises an input/output interface 460 for communicating with external devices, using communication technologies, such as USB, infrared, Bluetooth™, or the like. The haptic interface 462 provides tactile feedback to a user of the client device.

The optional GPS transceiver 464 can determine the physical coordinates of the computing device 400 on the surface of the Earth, which typically outputs a location as latitude and longitude values. GPS transceiver 464 can also employ other geo-positioning mechanisms, including, but not limited to, triangulation, assisted GPS (AGPS), E-OTD, CI, SAI, ETA, BSS, or the like, to further determine the physical location of the computing device 400 on the surface of the Earth. In one embodiment, however, the computing device 400 may communicate through other components, provide other information that may be employed to determine a physical location of the device, including, for example, a MAC address, IP address, or the like.

Figure 5:
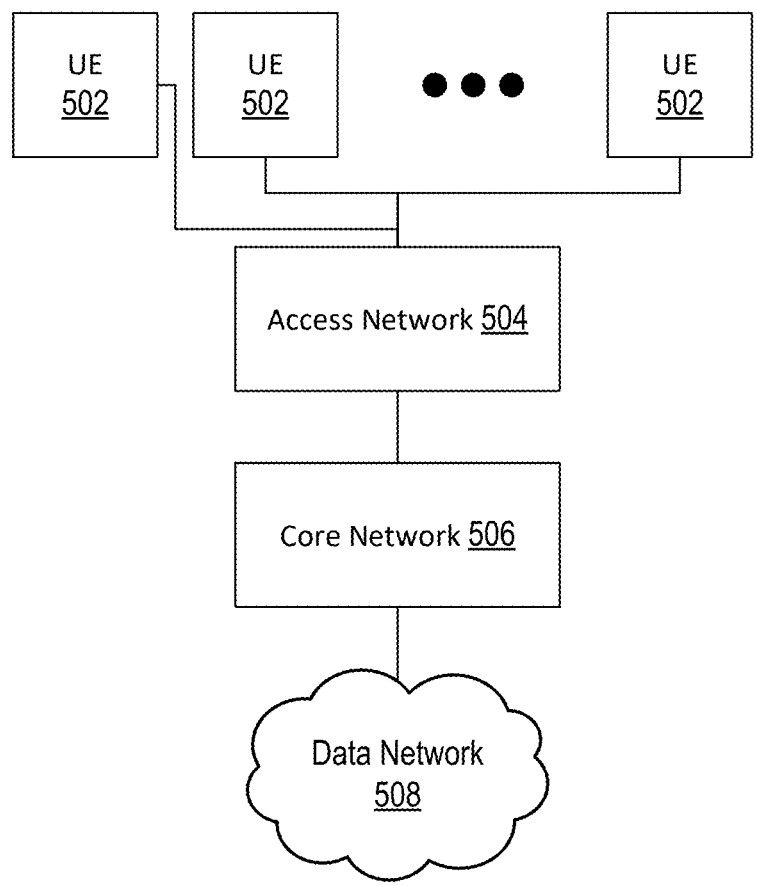
FIG. 5 is a block diagram of an example network architecture according to some embodiments of the present disclosure.

FIG. 5 is a block diagram of an example network architecture according to some embodiments of the present disclosure. In the illustrated embodiment, UE 502 accesses a data network 508 via an access network 504 and a core network 506. In the illustrated embodiment, UE 502 comprises any computing device capable of communicating with the access network 504. As examples, UE 502 may include mobile phones, tablets, laptops, sensors, IoT devices, autonomous machines, unmanned aerial vehicles (UAVs), wired devices, wireless handsets, and any other devices equipped with a cellular or wireless or wired transceiver. One non-limiting example of a UE is provided in FIG. 4.

In the illustrated embodiment of FIG. 5, the access network 504 comprises a network allowing network communication with UE 502. In general, the access network 504 includes at least one base station that is communicatively coupled to the core network 506 and coupled to zero or more UE 502.

In some embodiments, the access network 504 comprises a cellular access network, for example, a fifth-generation (5G) network or a fourth-generation (4G) network. In one embodiment, the access network 504 can comprise a Next-Gen Radio Access Network (NG-RAN), which can be communicatively coupled to UE 502. In an embodiment, the access network 504 may include a plurality of base stations (e.g., eNodeB (eNB), gNodeB (gNB)) communicatively connected to UE 502 via an air interface. In one embodiment, the air interface comprises a New Radio (NR) air interface. For example, in a 5G network, UE 502 can be communicatively coupled to each other via an X2 interface.

In the illustrated embodiment, the access network 504 provides access to a core network 506 to the UE 502. In the illustrated embodiment, the core network may be owned and/or operated by a network operator (NO) and provides wireless connectivity to UE 502 via access network 504. In the illustrated embodiment, this connectivity may comprise voice and data services.

At a high-level, the core network 506 may include a user plane and a control plane. In one embodiment, the control plane comprises network elements and communications interfaces to allow for the management of user connections and sessions. By contrast, the user plane may comprise network elements and communications interfaces to transmit user data from UE 502 to elements of the core network 506 and to external network-attached elements in a data network 508 such as, but not limited to, the Internet, a local area network (LAN), a wireless LAN, a wide area network (WAN), a mobile edge computing (MEC) network, a private network, a cellular network, and the like.

In the illustrated embodiment, the access network 504 and the core network 506 may be operated by a NO. However, in some embodiments, the networks (504, 506) may be operated by a private entity, different entities, and the like, and may be closed to public traffic. In these embodiments, the operator of the device can simulate a cellular network, and UE 502 can connect to this network similar to connecting to a national or regional network.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
receiving, by a network function repository function (NRF) on a network, a request from a Network Function (NF) service consumer, the request comprising information identifying data and an action to be performed by the NF service consumer on the data;
analyzing, by the NRF, the request;
determining, by the NRF, based on the analysis, an access scope of the request, the access scope comprising information corresponding to the data and the action;
determining, by the NRF, that an access token is granted to the NF service consumer based on the determined access scope, wherein, when the access token is determined to be granted, the NF service consumer is permitted to access the data and perform the action;
identifying, by the NRF, the access token for use based on the access token grant determination, the identification comprising:
retrieving the access token from a Unified Data Repository (UDR), the access token comprising information related to identification information of the NF service consumer, a requested data/service identifier, action type, and lifetime corresponding to at least one of a time period or number of uses;
generating a newly created token for the NF service consumer by modifying the retrieved access token, the modification comprising embedding a payload indicating a status code; and digitally signing, by the NRF, the created access token with a private key for authorization by a Nudr interface; and communicating, by the NRF over the network via the Nudr interface, a response to the NF service consumer based on the access token determination, the communication comprising the access token enabling the permitted access to the data and performance of the action.

2. The method of claim 1, further comprising:

determining, by the NRF, that an access token is denied to the NF service consumer based on the determined access scope, wherein the NF service consumer is not permitted to perform one of access the data and perform the action.

3. The method of claim 2, wherein the response further comprises a Hypertext Transfer Protocol (HTTP) POST response indicating a status code when the access token determination is granted.

4. The method of claim 2, further comprising:

receiving, at the unified data repository (UDR) on the network, a request from the NF service consumer that comprises the access token; and analyzing, by the UDR, the request by determining a validity of the access token.

5. The method of claim 4, further comprising:

enabling the NF service consumer to access the data and perform the action when the access token is determined to be valid.

6. The method of claim 4, wherein the UDR is a NF service provider that stores network data for access by NF service consumers, the network data comprising at least one of subscription data, policy data, structured data for exposure, application data and grouping identifier (ID) mapping data.

7. The method of claim 1, wherein the action corresponds to at least one of read, write and modify, and a type of the data corresponds to a type of the NF service consumer.

8. The method of claim 1, wherein the access token comprises information related to a type of action permitted to be performed, a type of data permitted to be accessed, and an identifier of the NF service consumer.

9. The method of claim 8, wherein the access token further comprises information limiting a usage of the access token to a predetermined time period.

10. The method of claim 1, wherein the NF service consumer is a device transmitting requests via NFs of the network, the NFs being at least one of a UDM (unified data management component), PCF (policy control function), NEF (network exposure function) and SCP (service communication proxy).

11. A non-transitory computer-readable storage medium tangibly encoded with computer-executable instructions, that when executed by a network function (NF) on a network, perform a method comprising:

receiving, by a network function repository function (NRF) on a network, a request from a NF service consumer, the request comprising information identifying data and an action to be performed by the NF service consumer on the data;

analyzing, by the NRF, the request, and determining an access scope of the request, the access scope comprising information corresponding to the data and the action;

determining, by the NRF, that an access token is granted to the NF service consumer based on the determined access scope, wherein the NF service consumer is permitted to access the data and perform the action;

identifying, by the NRF, the access token for use based on the access token grant determination, the identification comprising:

retrieving the access token from a Unified Data Repository (UDR), the access token comprising information related to identification information of the NF service consumer, a requested data/service identifier, action type, and lifetime corresponding to at least one of a time period or number of uses;

generating a newly created token for the NF service consumer by modifying the retrieved access token, the modification comprising embedding a payload indicating a status code; and digitally signing, by the NRF, the created access token with a private key for authorization by a Nudr interface; and communicating, by the NRF over the network via the Nudr interface, a response to the NF service consumer based on the access token determination, the communication comprising the access token enabling the permitted access to the data and performance of the action.

12. The non-transitory computer-readable storage medium of claim 11, further comprising:

determining, by the NRF, that an access token is denied to the NF service consumer based on the determined access scope, wherein the NF service consumer is not permitted to perform one of access the data and perform the action.

13. The non-transitory computer-readable storage medium of claim 12, wherein the response further comprises a Hypertext Transfer Protocol (HTTP) POST response indicating a status code when the access token determination is granted.

14. The non-transitory computer-readable storage medium of claim 12, further comprising:

receiving, at the unified data repository (UDR) on the network, a request from the NF service consumer that comprises the access token; and analyzing, by the UDR, the request by determining a validity of the access token.

15. The non-transitory computer-readable storage medium of claim 14, further comprising:

enabling the NF service consumer to access the data and perform the action when the access token is determined to be valid.

16. The non-transitory computer-readable storage medium of claim 14, wherein the UDR is a NF service provider that stores network data for access by NF service consumers, the network data comprising at least one of subscription data, policy data, structured data for exposure, application data and grouping identifier (ID) mapping data.

17. The non-transitory computer-readable storage medium of claim 11, wherein the action corresponds to at least one of read, write and modify, and a type of the data corresponds to a type of the NF service consumer.

18. The non-transitory computer-readable storage medium of claim 11, wherein the access token comprises information related to a type of action permitted to be performed, a type of data permitted to be accessed, and an identifier of the NF service consumer, wherein the access token further comprises information limiting a usage of the access token to a predetermined time period.

19. A device comprising:

a processor configured to:

receive, over a network, a request from a Network Function (NF) service consumer, the request comprising information identifying data and an action to be performed by the NF service consumer on the data;

analyze the request, and determine an access scope of the request, the access scope comprising information corresponding to the data and the action;

determine that an access token is granted to the NF service consumer based on the determined access scope, wherein the NF service consumer is permitted to access the data and perform the action;

identify the access token for use based on the access token grant determination, the identification comprising:

retrieving the access token from a Unified Data Repository (UDR), the access token comprising information related to identification information of the NF service consumer, a requested data/service identifier, action type, and lifetime corresponding to at least one of a time period or number of uses;

generating a newly created token for the NF service consumer by modifying the retrieved access token, the modification comprising embedding a payload indicating a status code; and digitally signing the created access token with a private key for authorization by a Nudr interface; and communicate, over the network via the Nudr interface, a response to the NF service consumer based on the access token determination, the communication comprising the access token enabling the permitted access to the data and performance of the action.

20. The device of claim 19, wherein the processor is further configured to:

receive a request from the NF service consumer that comprises the access token;

analyze the request by determining a validity of the access token; and enable the NF service consumer to access the data and perform the action when the access token is determined to be valid.

* * * * *